US008602612B2

(12) United States Patent
Stathis et al.

(10) Patent No.: US 8,602,612 B2
(45) Date of Patent: Dec. 10, 2013

(54) ELECTRICALLY CONDUCTIVE BALL JOINTS AND LIGHTING FIXTURES USING THE JOINTS

(76) Inventors: Peter Stathis, San Francisco, CA (US); Derrick Hurst, San Francisco, CA (US)

(*) Notice: Subject to any disclaimer, the term of this patent is extended or adjusted under 35 U.S.C. 154(b) by 0 days.

(21) Appl. No.: 13/469,461

(22) Filed: May 11, 2012

(65) Prior Publication Data

US 2012/0294004 A1 Nov. 22, 2012

Related U.S. Application Data

(60) Provisional application No. 61/485,533, filed on May 12, 2011.

(51) Int. Cl.
*F21V 21/26* (2006.01)
*F21V 21/00* (2006.01)
*F16C 11/06* (2006.01)

(52) U.S. Cl.
USPC ............................ 362/413; 362/427; 403/135

(58) Field of Classification Search
CPC ........ F21V 21/30; F21V 21/116; F21S 6/002; F21S 6/00
USPC ................ 362/427, 249.09, 287; 403/122, 27
See application file for complete search history.

(56) References Cited

U.S. PATENT DOCUMENTS 3,790,773 A * 2/1974 Sapper .......................... 362/401
4,463,413 A 7/1984 Shirley
4,638,413 A 1/1987 Tarlow
4,719,549 A * 1/1988 Apel ............................. 362/398
5,586,820 A 12/1996 Klink
5,613,771 A 3/1997 Siverling
5,664,747 A 9/1997 Eilering
5,732,924 A 3/1998 Hegarty et al.
5,772,174 A 6/1998 Hirsch et al.
5,997,151 A 12/1999 Douglass, II
6,022,119 A 2/2000 Booty, Jr.
6,129,319 A 10/2000 Metelski
7,061,169 B1 6/2006 Fung
7,367,742 B2 5/2008 Brunneke et al.
7,467,871 B2 12/2008 Lawhorn et al.
2005/0092874 A1 5/2005 Lawhorn et al.
2006/0029904 A1 2/2006 Rose et al.
2006/0120092 A1 6/2006 Sapper
2006/0166161 A1 7/2006 Rose et al.
2007/0109797 A1 5/2007 Reda, Jr.
2008/0096156 A1 4/2008 Rose et al.
2008/0096159 A1 4/2008 Rose et al.
2009/0142724 A1 6/2009 Rosenblood et al.
2009/0236484 A1 9/2009 Koch et al.
2010/0002442 A1 1/2010 Claerhout et al.
2010/0265461 A1 10/2010 Gille et al.

* cited by examiner

FOREIGN PATENT DOCUMENTS

DE 4344073 A1 7/1995

*Primary Examiner* — Tracie Y Green
(74) *Attorney, Agent, or Firm* — PatentBest; Andrew McAleavey

(57) ABSTRACT

An electrically conductive ball joint and lighting fixtures using the joint are disclosed. The joint has a ball with a first portion connected to a first electrical signal and a second portion connected to a second electrical signal. The first and second portions are electrically isolated from one another by a nonconductive bushing. A socket receives the ball and has a first set of electrical contacts adapted to make contact with the first portion of the ball and a second set of electrical contacts adapted to make contact with the second portion of the ball. The two portions of the ball are unequal, with one portion being larger than the other. The lighting fixtures generally comprise a base and two or more arms connected to the base. The arms are connected to one another electrically and structurally with the electrically conductive ball joints, and may be counterweighted.

19 Claims, 7 Drawing Sheets

ELECTRICALLY CONDUCTIVE BALL JOINTS AND LIGHTING FIXTURES USING THE JOINTS

CROSS-REFERENCE TO RELATED APPLICATIONS

This application claims priority to U.S. Provisional Patent Application No. 61/485,533, filed May 12, 2011. The entire contents of that application are incorporated by reference in their entirety.

BACKGROUND OF THE INVENTION

1. Field of the Invention

In general, the invention relates to conductive ball joints, and to lamps and other structures using the conductive ball joints.

2. Description of Related Art

Ball joints are used to join two structures while allowing one to move with respect to another in multiple planes. A typical ball joint comprises a spherical or hemispherical "ball" mounted on the end of a first structure and a complementary socket on a second structure. The ball is received in and permitted to move within the socket, allowing the two structures to move relative to one another with up to three degrees of freedom.

Ball joints are common in many different types of machines, ranging from automobiles to lighting fixtures, and have been implemented in many different sizes, with different materials, and with different load-carrying capacities. In some cases, a ball joint simply provides mechanical connection and load transmission between and through the structures that it connects.

In many cases, it is necessary to transmit some form of electricity or electrical signal past or through the ball joint. Typically, this is done by creating a hole or bore through the ball of the ball joint and inserting wires through the hole or bore to carry the signal. Wires can also be routed around the joint in some cases. While common, these types of solutions can be problematic. For example, the presence of the wires can restrict the range of motion of the ball joint, and continued motion can strain or wear the insulation on the wires, raising the possibility of electrical short.

U.S. Pat. No. 7,061,169 to Fung purports to disclose a solution to this problem: an electrically conductive ball, split into two equally-sized, electrically isolated conductive halves by an insulator, to carry both voltage and ground. The socket in which the conductive ball rests is similarly electrically conductive. However, the Fung conductive ball joint is problematic, as it appears that the circuit will short out as the ball moves through its full range of motion.

Effective, reliable means for transmitting electricity and electrical signals past or through ball joints would be particularly useful for lighting fixtures and other products which are frequently repositioned, and in which a relatively large range of motion is desirable.

SUMMARY OF THE INVENTION

One aspect of the invention relates to an electrically conductive ball joint that can be used to join two members structurally and electrically. The ball of the ball joint is divided into two portions, with one portion generally being larger than the other. Each portion is adapted to carry a different electrical signal (e.g., voltage or ground), and the two portions are electrically isolated from one another by a nonconductive ball bushing interposed between them. The socket has a nonconductive socket bushing that receives the assembled ball and allows it to move. The socket bushing has one or more first contacts and one or more second contacts which are arranged to contact the first ball portion and the second ball portion, respectively. In this way, power or other electrical signals can be transferred across the electrically conductive ball joint without passing wires across, through, or around the joint. In fact, in some embodiments, the first and second members that are joined by the ball joint may be used as electrical conductors to conduct one of the two electrical signals themselves.

In some embodiments, the contacts extending from the socket bushing may be electrically conductive contact pins that are arranged in appropriate locations extending through openings or holes in the socket bushing to contact the appropriate, corresponding portions of the ball. These contact pins may be contoured and resiliently biased to remain in contact with the ball and to move across its surface as the ball moves relative to the socket bushing. In other embodiments, the contacts may be wires or blades provided on a common, resilient carrier set into a recess in the socket bushing. In these embodiments, the common carrier resiliently biases the contacts toward contact with the ball.

Another aspect of the invention relates to lighting fixtures. The lighting fixtures generally have a base, a first arm connected to the base, and a second arm connected to the first arm structurally and electrically using the electrically conductive ball joints described above. A lamp is coupled to the end of the second arm, and may be coupled to the second arm with another conductive ball joint. A counterweight is provided on the second arm adjacent to the electrically conductive ball joint to reduce net torques on the ball joint and assist in positioning the lighting fixture. The lamp may be a light-emitting diode (LED) or a group of LEDs. In some embodiments, a third arm may be coupled between the second arm and the lamp using additional conductive ball joints, for a total of three electrically conductive ball joints. If a third arm is provided, a second counterweight may be provided on the end of the third arm proximate to the ball joint that attaches it to the second arm.

These and other aspects, features, and advantages of the invention will be set forth in the description that follows.

BRIEF DESCRIPTION OF THE DRAWING FIGURES

The invention will be described with respect to the following drawing figures, in which like numerals represent like features throughout the drawings, and in which.

DETAILED DESCRIPTION

Figure 1:
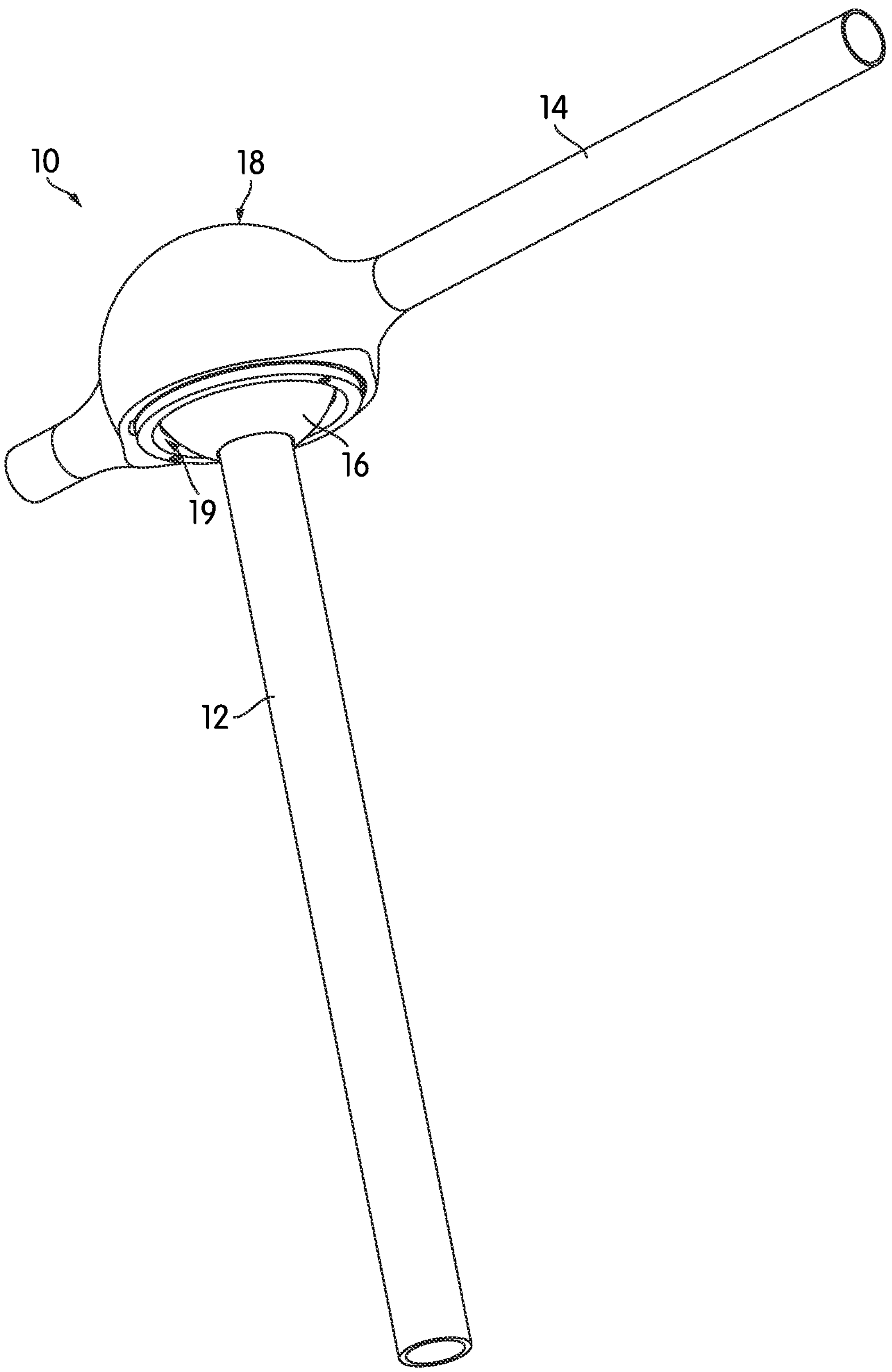
FIG. 1 is a perspective view of two members joined by an electrically conductive ball joint according to one embodiment of the invention.

FIG. 1 is a perspective view of a conductive ball joint, generally indicated at 10, according to one embodiment of the invention. As shown, the ball joint 10 joins a first member 12 and a second member 14. More particularly, a ball portion 16 is attached at one end of the first member 12, and the ball portion 16 is received in a socket 18 that forms a part of the second member 14. In the arrangement illustrated in FIG. 1, the second member 14 extends generally orthogonal to the first member 12, although this need not be the case in all embodiments. Generally speaking, the ball joint 10 may be positioned to join the two members 12, 14 at any angle, e.g., end-to-end, orthogonal, or in any other relationship. As will be described below in more detail, the ball joint 10 provides the two members 12, 14 with a full 360° of rotation between them in a plurality of planes. In fact, the two members 12, 14 can be rotated continuously with respect to one another, beyond 360°, as many turns as desired.

Figure 2:
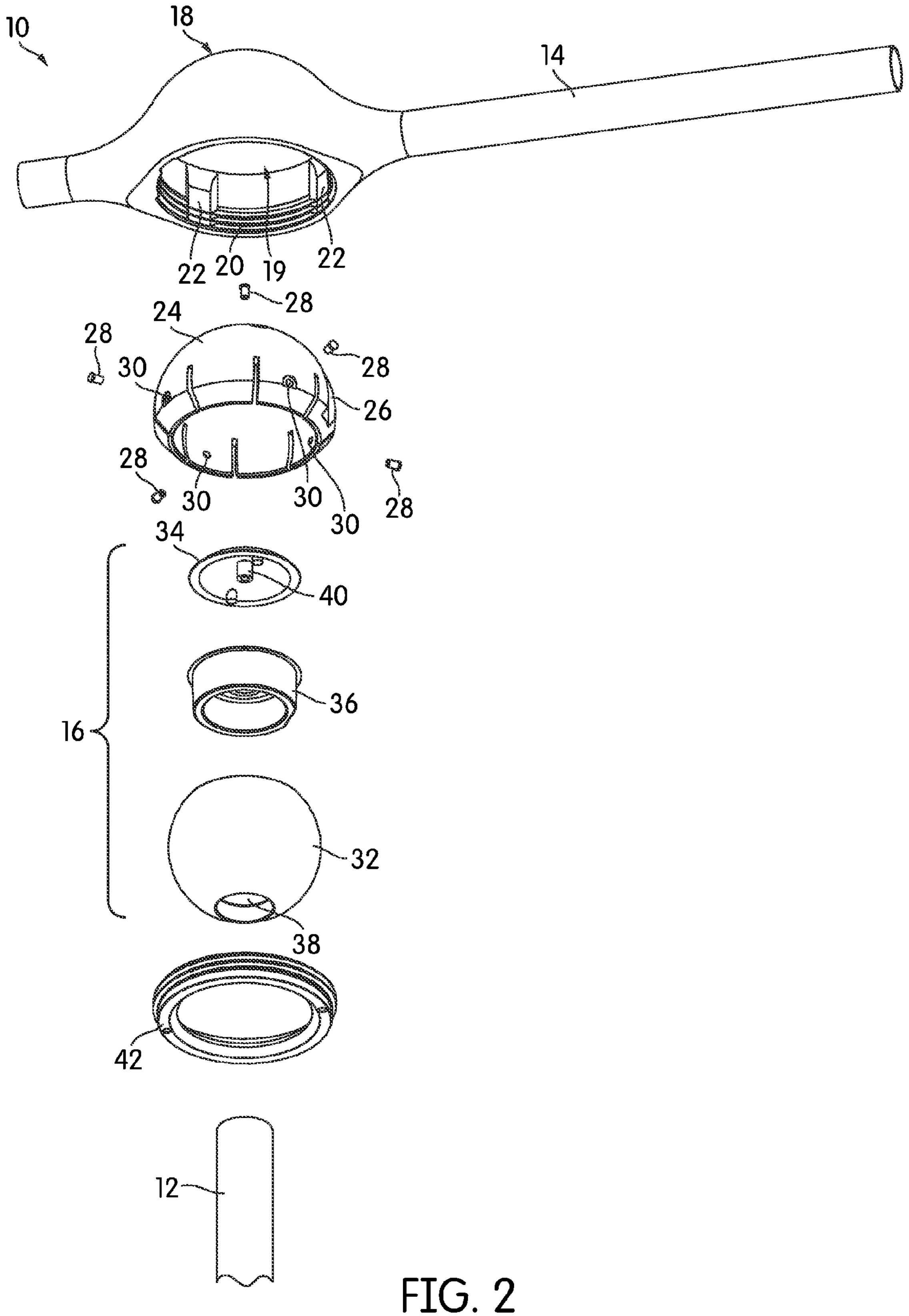
FIG. 2 is an exploded view of the ball joint of FIG. 1.

FIG. 2 is an exploded perspective view of the conductive ball joint 10. The socket body 19 itself is generally hemispherical in shape and includes a set of threads along its interior lower circumference, and a set of keying/locking features 22 arrayed at regular intervals around its interior surface. In the illustrated embodiment, the keying/locking features 22 of the socket body 19 are generally rectangularly-shaped recesses in the socket body 19.

A socket bushing 24 is sized and adapted to fit within the socket 18. The socket bushing 24 has a complementary set of projecting keying/locking features 26 that mate or engage with the keying/locking features 22 of the socket bushing 24 and prevent the socket bushing 24 from rotating within the socket body 19. In a typical arrangement, the socket body 19 would be made of a metal or plastic, while the socket bushing 24 would be made of an electrical insulator, such as polyethylene, polypropylene, nylon, or polyvinyl chloride (PVC). Since the socket bushing 24 is the component that actually receives and engages the ball 16 and wears against it, it is also advantageous if the material of which it is made can sustain the level of frictional wear expected in the ball joint.

The socket bushing 24 also receives a plurality of electrically conductive contact pins 28 which are inserted into and through corresponding holes 30 in the socket bushing 24. The conductive contact pins 28 serve to maintain electrical contact with the ball 16 as it moves within the socket bushing 24. Conductive wires may be attached to the rear surfaces of the contact pins 28 by soldering, taping, or another means of securement in order to convey voltages and signals from the pins 28 through the second member 14.

The ball 16 is comprised of three major portions: an electrically conductive lower ball portion 32, an electrically conductive upper ball portion 34 and an insulative ball bushing 36 that is seated within a cavity in the lower ball portion 32 and electrically insulates and isolates the lower ball portion 32 from the upper ball portion 34. An electrical contact 40 on the underside of the upper ball portion 34 allows for a connection with a signal wire. As divided by the ball bushing 36, the ball can carry two electrical signals, typically a voltage and a ground, with one portion 32, 34 carrying the voltage and the other portion 32, 34 carrying the ground. This will be described below in more detail.

At the bottom of the lower ball portion 32, an opening 38 and associated cavity allow the ball 16 to be threaded, press-fit, adhered, or otherwise secured to the first member 12. Under the lower ball portion 32, a retaining ring 42 engages the screw threads 20 of the socket body 19 to retain the assembled ball 16 within the socket bushing 24 and the socket bushing 24 within the socket body 19. In some embodiments, the retaining ring 42 may also help to keep the upper contact pin 28 within the area defined by the upper ball portion 34

As can be seen in FIG. 2, although the ball 16 is divided into upper and lower ball portions 34, 32, the two portions are not equal hemispheres. Instead, the lower ball portion 32 is much larger than the upper ball portion 34. For example, the lower ball portion 32 may comprise about 75-80% or more of the volume of the ball 16 and at least 75% or more of the surface area of the ball 16, with some embodiments of the lower ball portion 32 having 85-90% of the surface area of the ball 16. Thus, as was noted briefly above, the ball 16 and socket 18 can rotate 360° or more with respect to one another in a plurality of planes. As those of skill in the art will understand, the size and area of the upper ball portion 34 and the position of the contact pin 28 in it determine how much the angle between the first member 12 and the second member 14 can be increased or reduced. The range of motion of the ball joint 10 relative to the proportions of the ball portions 32, 34 can be determined geometrically.

Figure 3:
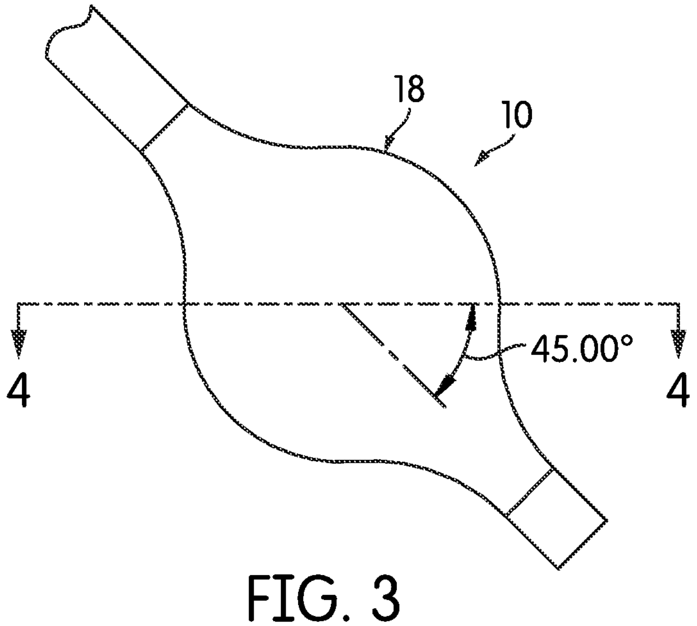
FIG. 3 is a schematic top plan view of the ball joint.
Figure 4:
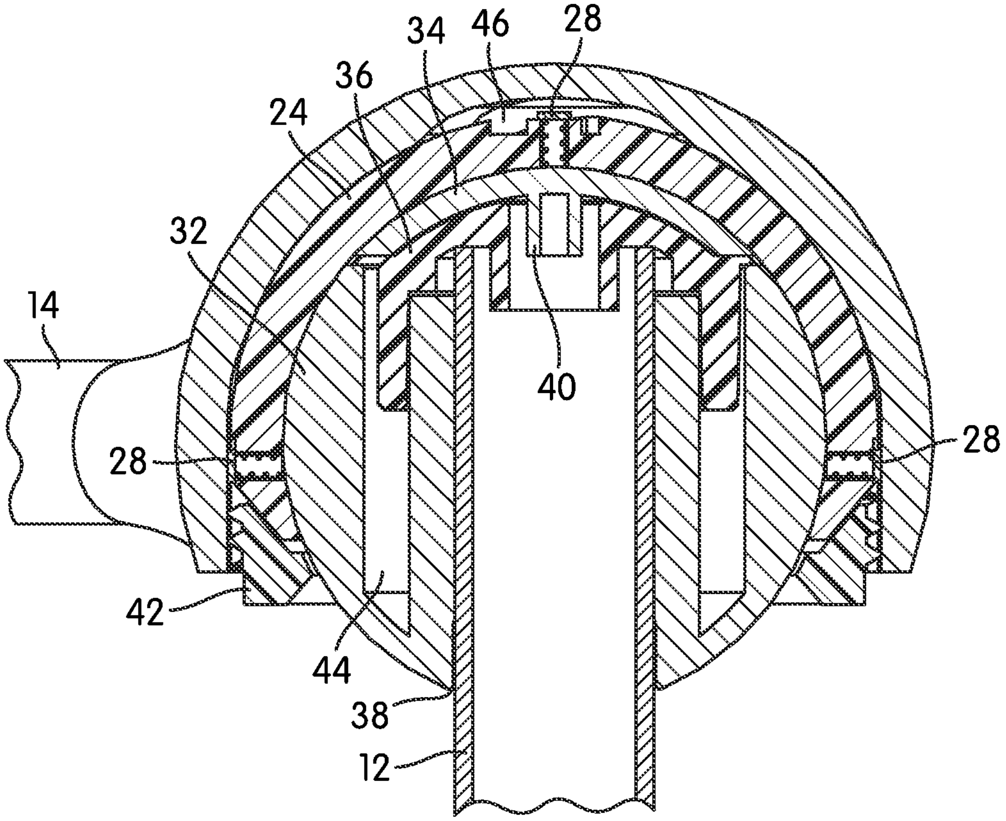
FIG. 4 is a sectional view of the ball joint taken through Line 4-4 of FIG. 3.

FIG. 3 is a schematic top plan view of the ball joint 10, illustrating with Line 4-4 the plane through which the sectional view of FIG. 4 is taken. FIG. 14 illustrates the ball 16 seated in the socket bushing 24 within the socket body 19. As shown, the lower ball portion 32 is arranged such that it maintains contact with four of the contact pins 28, two of which are shown in the sectional view of FIG. 4. The fifth contact pin 28, at the top of the socket body 19, makes and maintains contact with the upper ball portion 34. With this configuration, the pins 28 move against the surface of the ball portions 32, 34 as the ball moves within the socket bushing 24, thereby maintaining power transfer through the ball 16. The pins 28 may be spring-loaded telescoping pins with curved ends, such that they are both mechanically biased to remain in contact with the surface of the ball 16 and adapted to its curvature.

The arrangement of the ball bushing 36 within a cavity 44 in the lower ball portion 32 is also shown in FIG. 4. As can be appreciated from FIG. 4, in addition to electrically insulating and isolating the upper ball portion 34 from the lower ball portion 32, the ball bushing 36 also electrically isolates the end of the first member 12 from the upper and lower ball portions 32, 34. If the first member 12 is made of a metal or of another electrically conductive material, it may be painted, coated, or otherwise insulated to prevent electrical shorts along the portions that contact the ball 16.

In general, conductive wires may extend within and along the open channels formed in the interiors of the first and second members 12, 14 to bring electrical signals to and from the ball joint 10. Within the ball joint 10 itself, as was described briefly above, conductive wires or other conductive elements from the first member 12 may be attached within the ball 16 to convey electrical signals from the first member 12 to the conductive upper and lower ball portions 32, 34. Wires may also be attached to the contact pins 28 between the socket bushing 24 and the socket body 19 to convey signals from the socket 18 into the second member 14.

However, wires may not be necessary to convey all of the signals. For example, if the first member 12 and the second member 14 are themselves conductive, they may be used to conduct at least one of the signals, thereby reducing the number of wires within the members 12, 14 and the ball joint 10. In this case, one of the signals, typically either voltage or ground, would be carried by the members 12, 14 themselves, and the other signal would be carried by a insulated wire or another conductive element electrically isolated from the first and second members 12, 14. Additionally, as those of skill in the art will understand, exposed areas of the first and second members 12, 14 may be coated, insulated, or otherwise passivated to prevent electrical shorts. FIG. 4 illustrates an example of this type of conduction. In FIG. 4, the four contact pins 28 that contact the lower ball portion 32 also contact and convey electricity directly into the socket body 19, while the contact pin 28 that contacts the upper ball body 34 is attached to a wire (not shown in FIG. 4) that rests in the cavity 46 between the socket bushing 24 and the socket body 19. Thus, only a single insulated wire is necessary in the ball joint 10. Of course, whether one of the members 12, 14 is used as a conductor will depend on the voltage and current levels that are being carried, the resistance of the material of which the two members 12, 14 are made, safety considerations, and other conventional factors.

Figure 5:
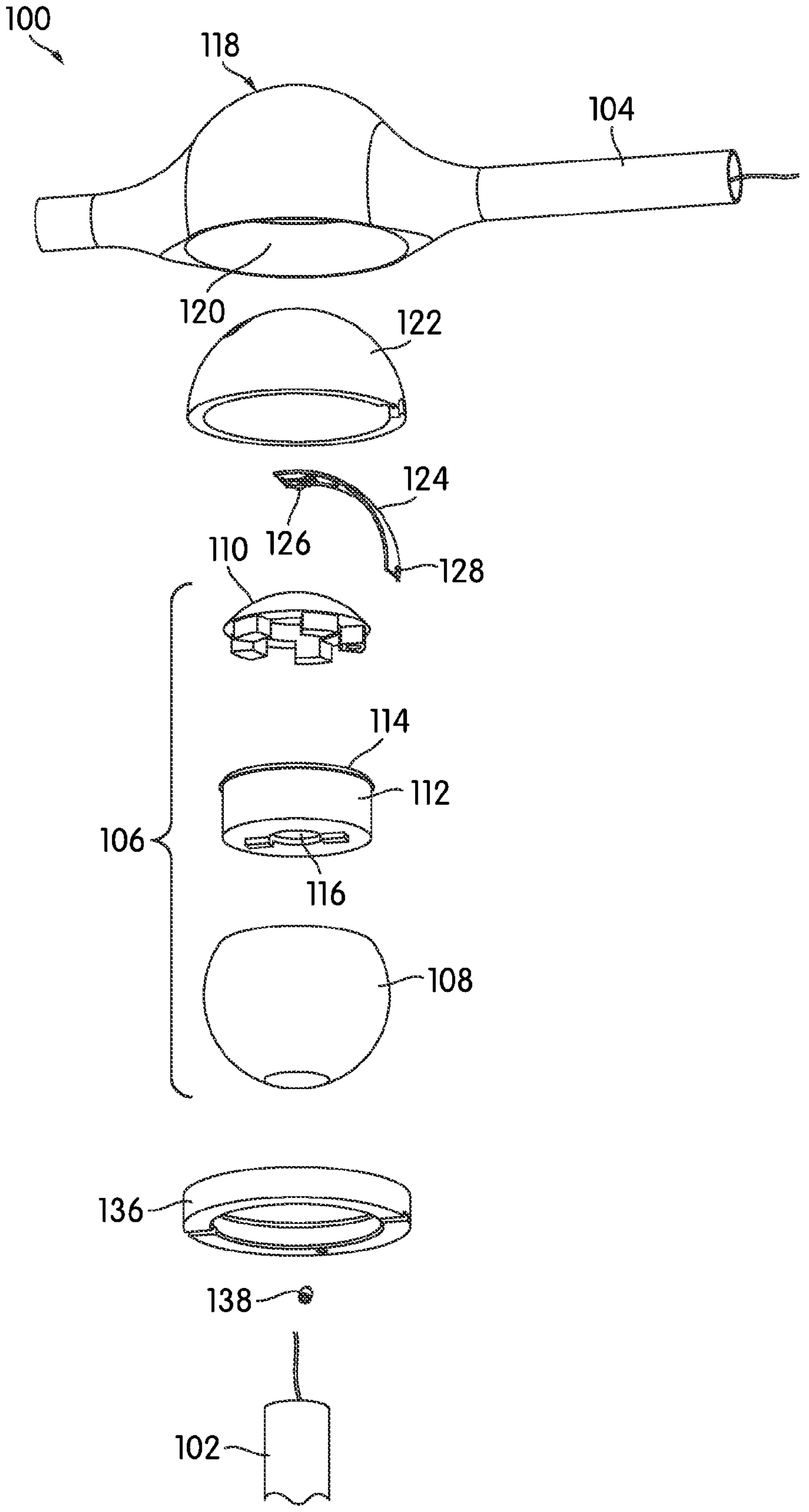
FIG. 5 is an exploded view of an electrically conductive ball joint according to another embodiment of the invention.
Figure 6:
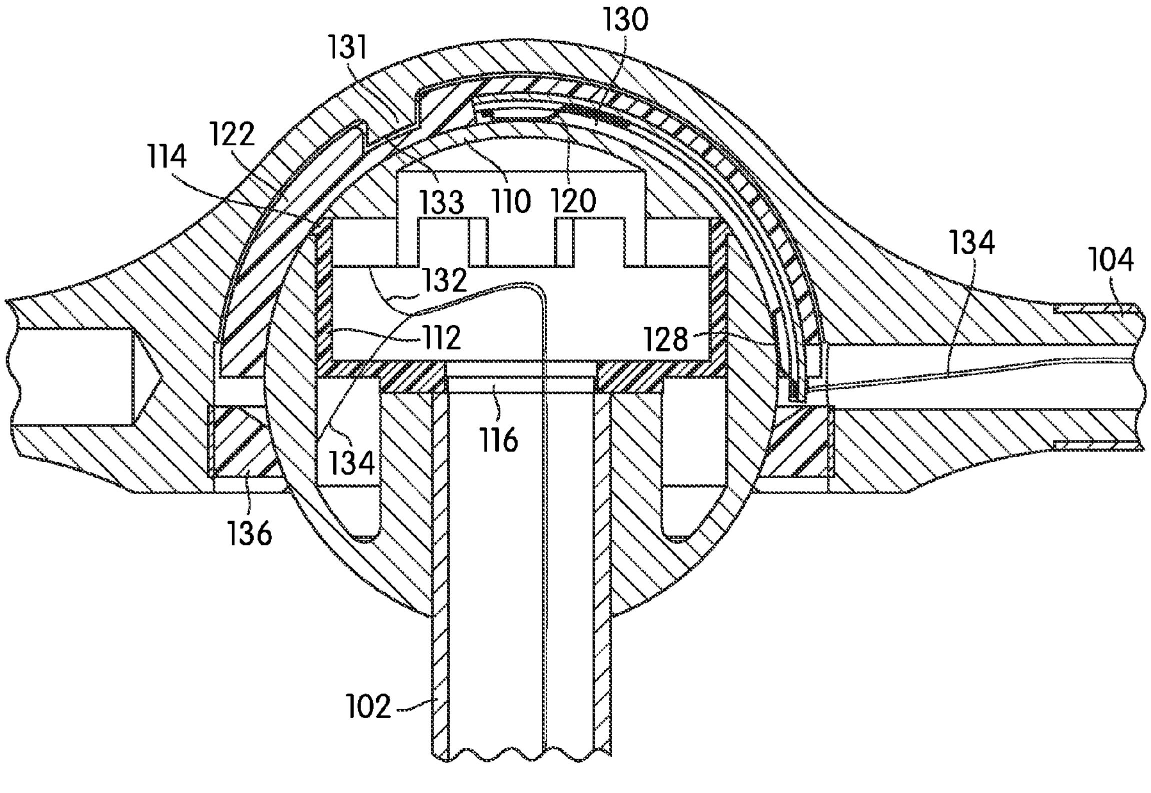
FIG. 6 is a sectional view of the ball joint of FIG. 5.

FIGS. 5 and 6 are exploded and sectional views, respectively, of an electrically conductive ball joint, generally indicated at 100, according to another embodiment of the invention. The ball joint 100 is generally similar to the ball joint 10 of FIGS. 1-4; therefore, where a component is not specifically described, it may be assumed to be similar to that described above.

As shown in FIG. 5, the ball joint 100 joins a first member 102 with a second member 104. The ball 106 of the joint 100 comprises a larger lower ball portion 108 and a smaller upper ball portion 110 electrically isolated from one another by a ball bushing 112. The upper ball portion 110 and the lower ball portion 108 may have about the same proportions relative to each other as in the ball joint 10. The ball bushing 112 is cup-like in form with an upper circumferential lip 114 and openings 116 that allow contact wires to pass. The socket 118 is also similar to that in the ball joint 10, with a socket body 120 and a generally hemispherical socket bushing 122, made of an electrically insulative material and adapted to be received in the socket body 120.

The ball joint 100 differs from the ball joint 10 in the manner in which the ball 106 makes electrical contact with the socket 118. Specifically, in the ball joint 100, instead of contact pins 28, a curved resilient contact member 124 is inserted between the ball 106 and the socket bushing 122. The contact member 124 has two sets of contacts 126, 128, one set of contacts 126, 128 positioned proximate to each end of the contact member 124. The contacts 126, 128 themselves are sets of curved wires or blades.

As shown in the sectional view of FIG. 6, the contact member 124 rests within a groove or recess 130 in the socket bushing 122 such that the first set of contacts 126 bears against the upper ball portion 110 and the second set of contacts 128 bears against the lower ball portion 130. The shape of the contact member 124, and its position bearing between the ball 106 and the socket bushing 122, resiliently bias it to keep the contacts 126, 128 in physical and electrical contact with the ball 106. A keying/locking feature 131 extending from the interior of the socket body 120 engages a corresponding keying/locking channel or recess 133 in the socket bushing 122 to fix the socket bushing 122 in place.

In the embodiment of FIG. 6, the two members 102, 104 are not used as conductors. Instead, a pair of wires 132, 134, or a single wire with two leads, enters the ball 106 from the first member 102 and makes electrical contact with the upper ball portion 110 and the lower ball portion 108, respectively. A second pair of wires 134 connects to the contacts 126, 128 and transits the second member 104.

A retaining ring 136 is installed to retain the ball 106 within the socket body 120. The retaining ring 136 is adapted to be installed using a set screw 138.

Conductive ball joints 10, 100 according to embodiments of the invention may carry any type of voltage or electrical signal, including direct current (DC) and alternating current (AC) voltages or signals. The features of any particular embodiment may depend, at least in part, on the type of current that is being carried, as well as the current and voltage levels.

The embodiments described above may be particularly suitable for low voltage embodiments. In this description, the term "low voltage" may be assumed to have the definition given to it in various industry standards, such as those promulgated by Underwriters' Laboratories (San Jose, Calif., USA), and typically refers to voltages less than about 50V, depending on current levels. In these types of low voltage embodiments, the two members 12, 14, 102, 104 can be used as conductors, if desired, and the ball 16, 106 may be arranged such that it is at least partially exposed, contributing to the aesthetic appearance of the device. Moreover, the ball 16, 106 may be made of a material such as nickel-plated aluminum or chrome-plated steel in order to improve its aesthetic appearance. The ball 16, 106 may also be made of a nonconductive material if it is coated or otherwise provided with a suitable conductive material on its surfaces.

In higher voltage embodiments, it may be advantageous to use dedicated wires or conductors, rather than using the members 12, 14, 102, 104 as conductors. Additionally, it may be advantageous to minimize the degree to which the ball 16, 106 is exposed, for example, by covering any portions that would be exposed with an insulated boot or covering.

Figure 7:
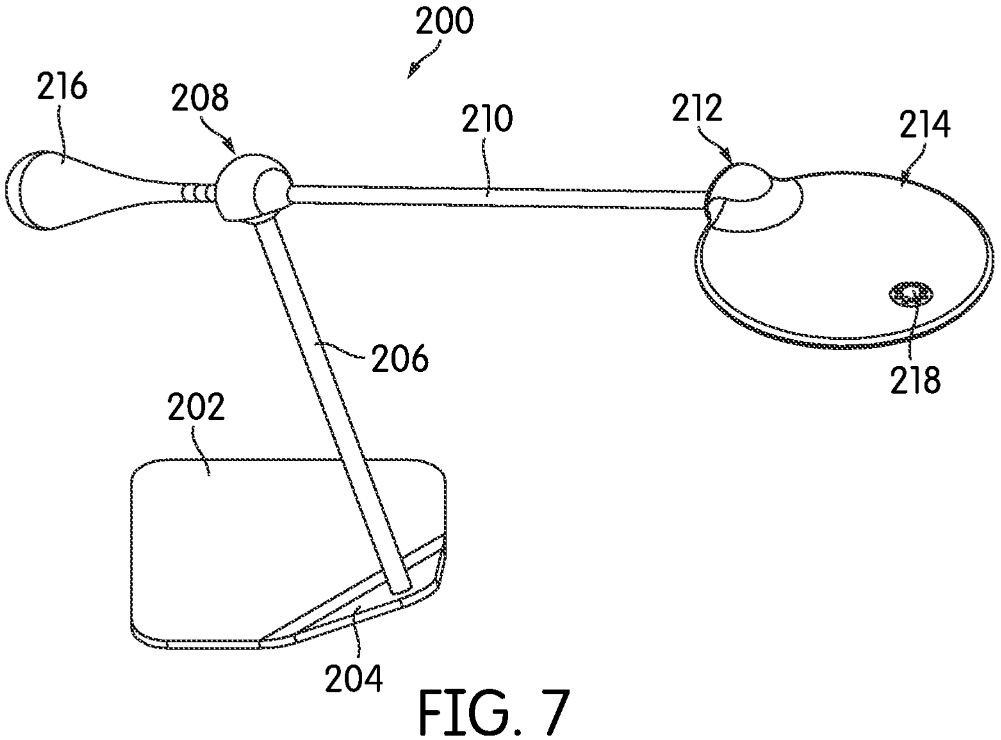
FIG. 7 is a perspective view of a lamp with a single counterweight and two conductive ball joints.
Figure 8:
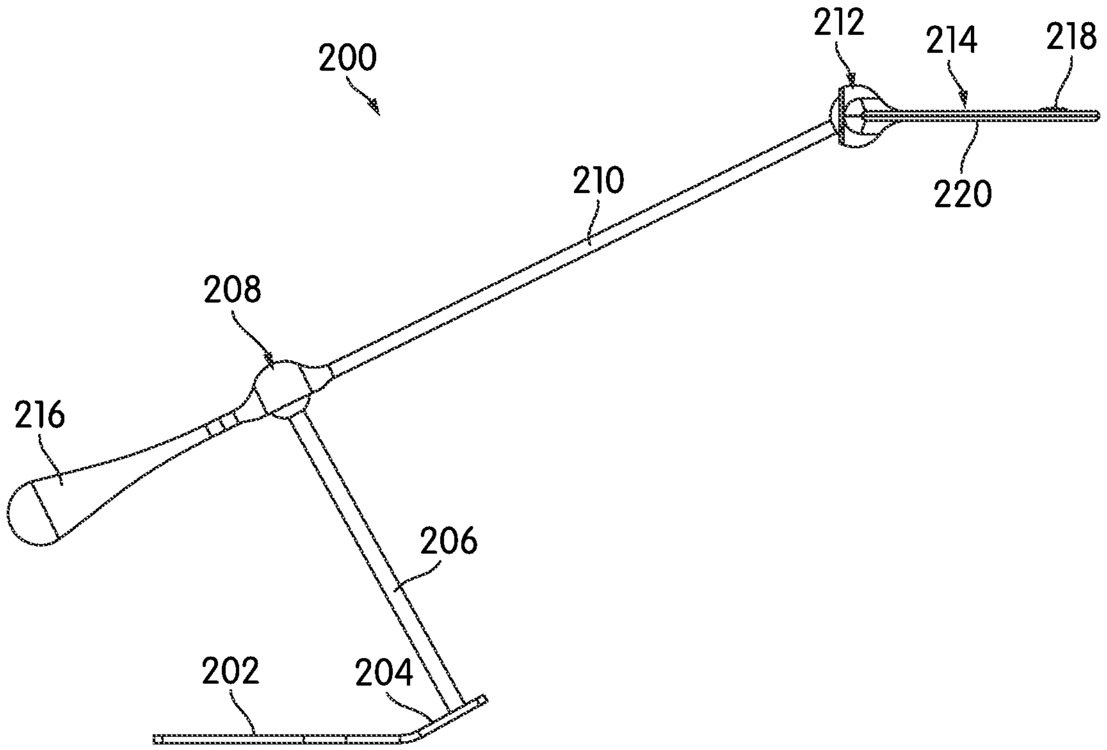
FIG. 8 is a side elevational view of the lamp of FIG. 7.

The electrically conductive ball joints 10, 100 are particularly suitable for use in lighting fixtures, which are often low voltage, and in which flexibility in positioning can be particularly helpful. FIGS. 7 and 8 are perspective and side elevational views, respectively, of a lighting fixture generally indicated at 200. The lighting fixture 200 has a foot or base 202 with an up-angled portion 204 from which a first arm member 206 extends. The lighting fixture 200 has two electrically conductive ball joints: a first conductive ball joint 208 that joins the first arm member 206 with a second arm member 210, and a second conductive ball joint 212 that joins the second arm member 210 with the head 214 of the lighting fixture 200. A single counterweight 216 is provided, extending opposite the direction of the second arm member 210, to balance the torques on the first conductive ball joint 208 and to allow the second arm member 210 to remain where it is placed.

The second arm member 210 can be continuously rotated 360° or more with respect to the first member 206 in the plane orthogonal to the plane of FIG. 8. In the plane of FIG. 8, the extent of the movement permitted is defined by the geometry of the upper ball portion 34, the lower ball portion 32, and their movement within the socket bushing 24.

Additionally, because of the second conductive ball joint 212, the head 214 of the lighting fixture 200 can be rotated continuously with respect to the second arm member 210 in multiple planes, with ranges of motion similar to those afforded by the first conductive ball joint 208.

As can be seen from the first and second electrically conductive ball joints 208, 212, if more than one electrically conductive ball joint is present in a device or fixture, the two joints need not be alike in shape, size, or range of motion. However, except for the outer shape of its socket, the second electrically conductive ball joint 212 generally has the same internal arrangement as the first electrically conductive ball joint 208.

The lighting fixture 200 provides low voltage to power a cluster of light emitting diodes (LEDs) 218. A lens or diffusing layer 220 may diffuse and/or focus the light from the LEDs 218. Typically, a transformer/inverter would be used to supply power at the voltage and current levels necessary for the LEDs 218. In addition to the LEDs 218, a plurality of LEDs may be arrayed in regular spacing around the perimeter of the head 214. In that case, the diffusing layer 220 may be a layer of optically suitable material that acts as an optical waveguide for the light from the LEDs. For example, 102 LEDs may be arrayed around the perimeter of the head 214, and the diffusing layer 220 may be made of a sheet of polycarbonate with suitable optical properties.

Figure 9:
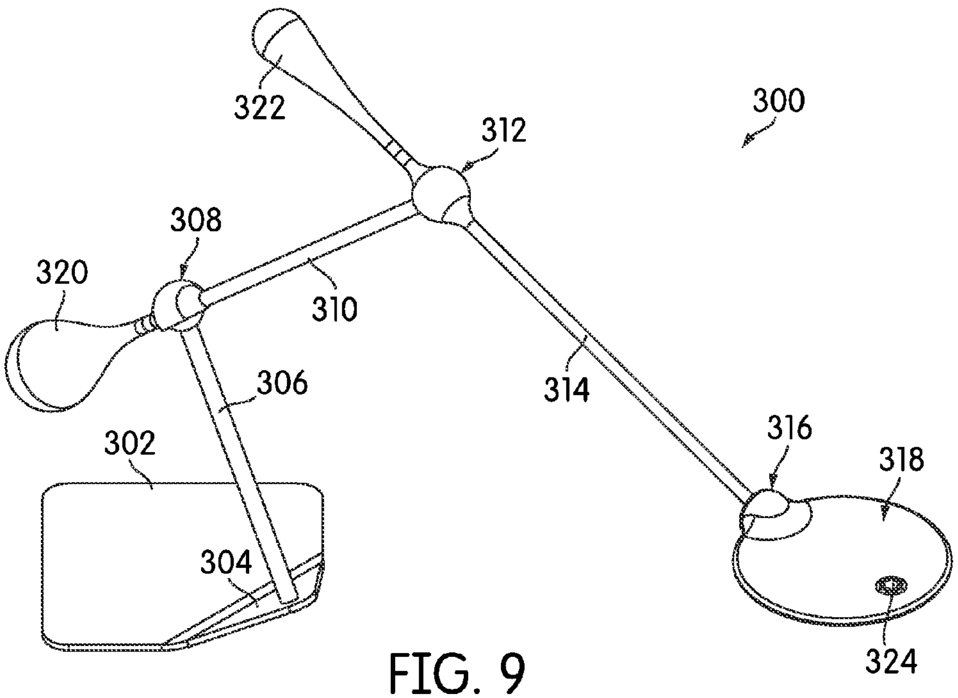
FIG. 9 is a perspective view of a lamp with two counterweights and three conductive ball joints.
Figure 10:
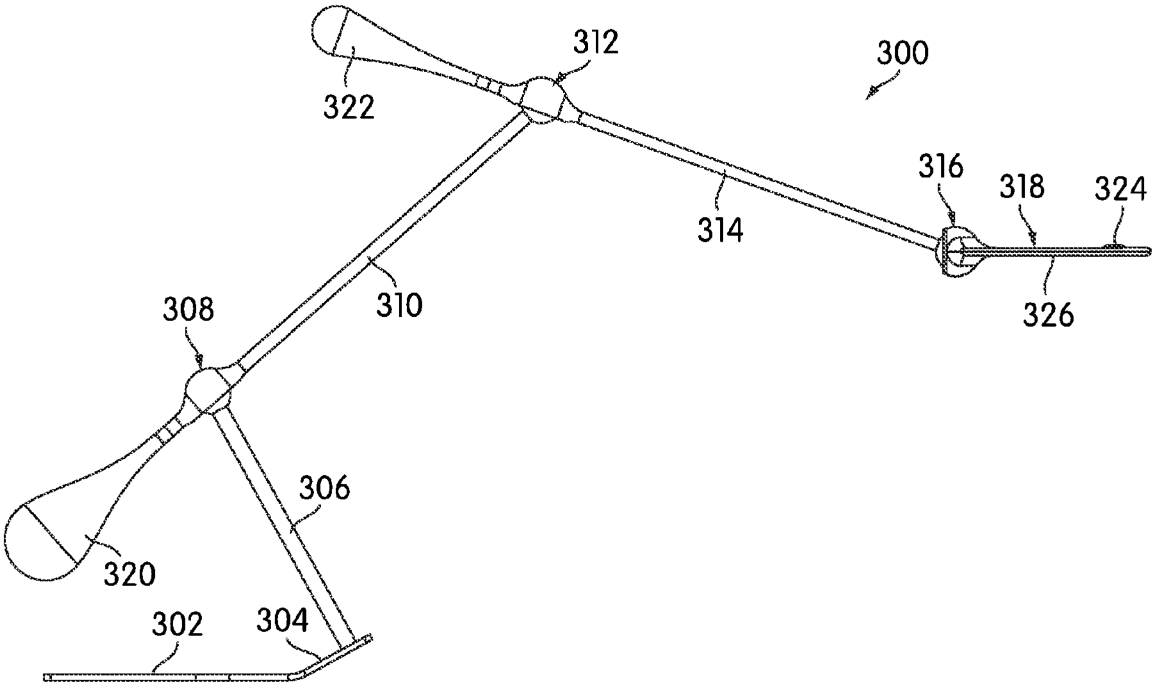
FIG. 10 is a side elevational view of the lamp of FIG. 9.

FIGS. 9 and 10 are perspective and side elevational views, respectively, of another lighting fixture, generally indicated at 300, according to an embodiment of the invention. The lighting fixture 300 has a foot or base 302 with an up-angled portion 304 from which a first arm member 306 extends. The lighting fixture 300 has two electrically conductive ball joints: a first conductive ball joint 308 that joins the first arm member 306 with a second arm member 310, a second conductive ball joint 312 that joins the second arm member 310 with a third arm member 314, and a third conductive ball joint 316 that joins the third arm member 314 with the head 318 of the lighting fixture 300. A first counterweight 320 is provided for the first conductive ball joint 308, and a second counterweight 322 is provided for the second conductive ball joint 312. As with the lighting fixture 200, the head 318 of the lighting fixture 300 contains a cluster of LEDs 324 and includes a lens or diffusing layer 326.

In the lighting fixture 300, the two conductive ball joints 308, 312 attached to the arm members 306, 310, 314 are essentially identical. The third conductive ball joint 316, like the conductive ball joint 212, is adapted to connect to the head 318 of the fixture 300. However, the two counterweights 320, 322 are of different sizes and weights, with the counterweight 320 being of a larger size because of the greater torques around the first conductive ball joint 308. The greater number of articulations provides for an even greater range of motion.

As those of skill in the art will understand, the precise number of conductive ball joints 10, 100 in any fixture or device will vary from embodiment to embodiment. In particular, in the lighting fixtures 200, 300 described above, the heads 214, 318 need not be connected via conductive ball joints 212, 316, although it is certainly advantageous to do so. Instead, in some embodiments, the connection may be fixed.

While the invention has been described with respect to certain embodiments, the embodiments are intended to be exemplary, rather than limiting. Modifications and changes may be made within the scope of the invention, which is defined by the claims.

What is claimed is:

1. An electrically conductive ball joint, comprising:

a ball including a first ball portion made of or coated with an electrically conductive material, a second ball portion made of or coated with an electrically conductive material, the second portion being larger than the first portion, and having an opening, recess, or cavity therein, and a ball bushing made of an electrically nonconductive, insulating material arranged in the cavity between the first ball portion and the second ball portion so as to electrically isolate the first and second ball portions from one another; and a generally hemispherical socket adapted to engage the ball for movement therein, the socket including a socket bushing made of an electrically nonconductive, insulating material, the socket bushing being sized, shaped, and adapted to be received in the socket, one or more first contacts adapted to make electrical contact with the first ball portion, and one or more second contacts adapted to make electrical contact with the second ball portion, the first and second contacts being electrically isolated from one another.

2. The conductive ball joint of claim 1, wherein the first and second contacts are conductive pins extending from the socket bushing.

3. The conductive ball joint of claim 2, wherein the conductive pins that comprise the first and second contacts extend through openings in the socket bushing.

4. The conductive ball joint of claim 3, wherein either the first contacts or the second contacts are in direct electrical contact with the socket, such that the socket is an electrical conductor.

5. The conductive ball joint of claim 2, wherein the conductive pins have contact surfaces that are contoured to match contours of the ball.

6. The conductive ball joint of claim 5, wherein the conductive pins are resiliently biased to remain in contact with the ball.

7. The conductive ball joint of claim 1, wherein the one or more first contacts and the one or more second contacts are curved wires or blades mounted on a common strip of material.

8. The conductive ball joint of claim 7, wherein the common strip of material is resilient, and is shaped and arranged to bias the first and second contacts toward contact with the ball.

9. The conductive ball joint of claim 8, wherein the common strip of material is arranged in a recess in the socket bushing and bears between the socket bushing and the socket.

10. The conductive ball joint of claim 1, wherein the socket bushing and the socket have complementary engaging structures that prevent the socket bushing from rotating with respect to the socket.

11. The conductive ball joint of claim 1, wherein the second ball portion has at least about 75% of the surface area of the ball.

12. The conductive ball joint of claim 1, wherein the conductive ball joint carries less than about 50 Volts of direct current.

13. An electrically conductive ball joint, comprising:

a ball including a first ball portion made of or coated with an electrically conductive material, a second ball portion made of or coated with an electrically conductive material, the second portion being larger than the first portion, and having an opening, recess, or cavity therein, and a ball bushing made of an electrically nonconductive, insulating material arranged in the cavity between the first ball portion and the second ball portion so as to electrically isolate the first and second ball portions from one another; and a generally hemispherical socket adapted to engage the ball for movement therein, the socket including a socket bushing made of an electrically nonconductive, insulating material, the socket bushing being sized, shaped, and adapted to be received in the socket, one or more first contact pins extending from first corresponding openings in the socket bushing, the first contact pins being adapted to make electrical contact with the first ball portion, and one or more second contact pins extending from second corresponding openings in the socket bushing, the second contact pins adapted to make electrical contact with the second ball portion, the first and second contacts being electrically isolated from one another.

14. The conductive ball joint of claim 13, wherein the first contact pins and the second contact pins have contact surfaces that are contoured to match contours of the ball and are resiliently biased to remain in contact with the ball.

15. The conductive ball joint of claim 13, wherein either the first contact pins or the second contact pins are in direct electrical contact with the socket, such that the socket is an electrical conductor.

16. The conductive ball joint of claim 13, wherein the one or more first contact pins comprise a single contact pin adapted to make electrical contact with the first ball portion, and the one or more second contact pins comprise a set of contact pins spaced around an inner circumference of the socket bushing.

17. A lighting fixture, comprising:

a base;

a first arm coupled to the base;

a second arm;

an electrically conductive ball joint coupled to the first arm and the second arm and connecting the first arm and the second arm both electrically and structurally, the electrically conductive ball joint including:

a ball including a first ball portion made of or coated with an electrically conductive material, a second ball portion made of or coated with an electrically conductive material, the second portion being larger than the first portion, and having an opening, recess, or cavity therein, and a ball bushing made of an electrically nonconductive, insulating material arranged in the cavity between the first ball portion and the second ball portion so as to electrically isolate the first and second ball portions from one another, and a generally hemispherical socket adapted to engage the ball for movement therein, the socket including a socket bushing made of an electrically nonconductive, insulating material the socket bushing b sized, shaped, and adapted to be received in the socket, one or more first contacts adapted to make electrical contact with the first ball portion, and one or more second contacts adapted to make electrical contact with the second ball portion, the first and second contacts being electrically isolated from one another; and at least one lamp coupled to the second arm.

18. The lighting fixture of claim 17, further comprising a counterweight arranged adjacent to the conductive ball joint on the second arm.

19. The lighting fixture of claim 18, further comprising:

a third arm coupled between the second arm and the lamp, the third arm being connected to at least the second arm both electrically and structurally by a second electrically conductive ball joint.

* * * * *